(No Model.)
W. C. FREEMAN.
BUTTER MOLD.
No. 598,775.  Patented Feb. 8, 1898.
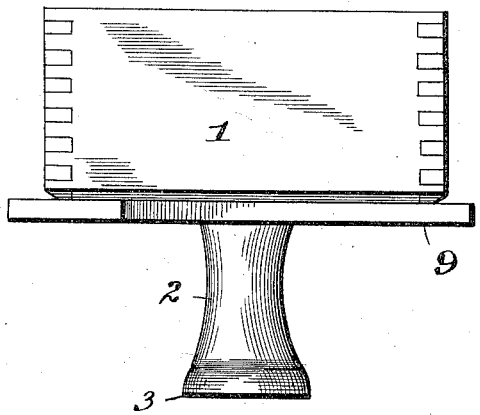
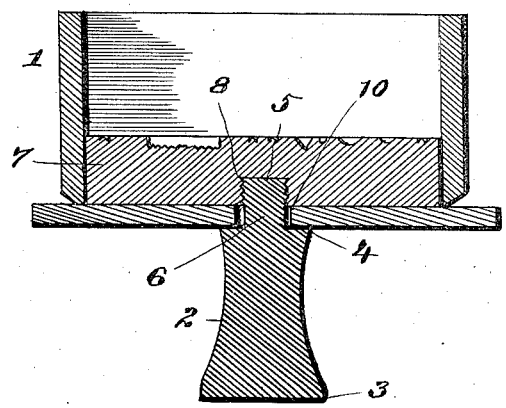
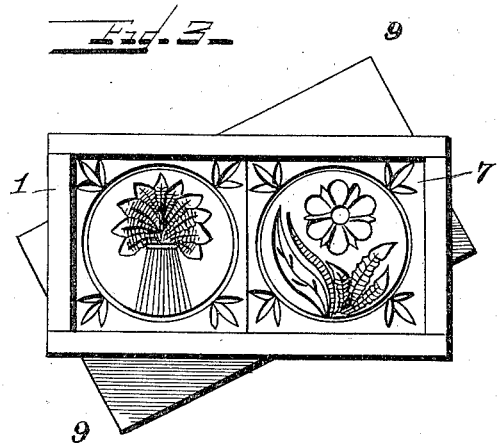
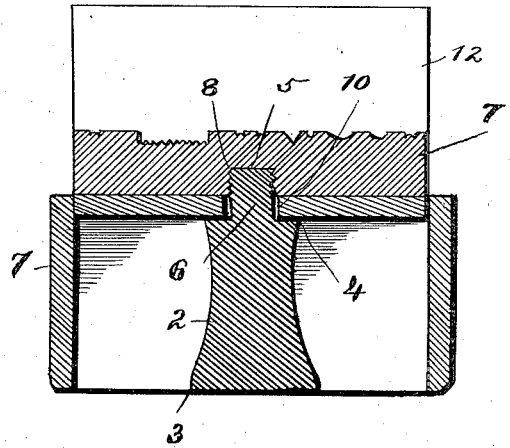
Witnesses
G. Clarkson
Herm N. Donath
Inventor
William C. Freeman
By Edwin S. Clarkson
his attorney

UNITED STATES PATENT OFFICE.

WILLIAM C. FREEMAN, OF KALKASKA, MICHIGAN.

BUTTER-MOLD.

SPECIFICATION forming part of Letters Patent No. 598,775, dated February 8, 1898.

Application filed October 15, 1897. Serial No. 655,350. (No model.)

*To all whom it may concern:*

Be it known that I, WILLIAM C. FREEMAN, a citizen of the United States, residing at Kalkaska, in the county of Kalkaska, in the State of Michigan, have invented a new and useful Improvement in Butter-Molds, of which the following is a specification.

The object of my invention is to produce a strong, light, and serviceable butter-mold of rectangular shape, preferably, in which butter or other similar goods may be pressed or molded into any desired shape and at the same time one or more sides of said goods be ornamented by coming into contact with a carved print, forming such designs as may be desired.

The invention consists of a suitable box or receptacle within which a follower or plunger is adapted to reciprocate, said plunger or print being suitably ornamented on one or more of its sides and having a screw-threaded bore in its lower face adapted to receive a handle or support, one end of which is reduced, such reduced portion being partially screw-threaded, while the remaining portion is smooth. The other end of the handle is considerably enlarged and serves as a support or base upon which the complete mold rests or is supported when in use. A table substantially the size of the plunger or print is provided with a central aperture through which the reduced end of the handle is adapted to pass, said table working freely upon or around the smooth portion of the reduced end of the handle and supported upon a shoulder formed upon the handle.

In the drawings, Figure 1 is a side elevation of the mold ready for use. Fig. 2 is a central longitudinal section through the same. Fig. 3 is a top plan view of Fig. 1; and Fig. 4 is a central longitudinal section of the mold with the parts in the position they would assume immediately after a print of butter has been discharged, the print of butter being shown upon the table.

1 represents a box or mold of rectangular shape, preferably, but of course it is obvious that its shape may be changed at will.

2 is a handle or support, provided with the enlarged base 3. The upper end of the handle is provided with a shoulder 4, from which extends a reduced portion having the threads 5 and the smooth portion 6, the threads being on the extreme end.

7 is a print one side of which is carved with a suitable design.

8 is a screw-threaded bore in one face of the print adapted for the reception of the screw-threaded portion of the handle.

9 is the table or supporting member, having a suitable central aperture 10 slightly larger than the diameter of the smooth portion 6 of the handle.

The parts are assembled by placing the table 9 upon the reduced portion of the handle 2. The handle is then screwed into the print and the mold is ready for use. The parts being assembled, as clearly shown in Fig. 1, butter is packed into the mold until the desired quantity is secured. Before packing the butter in the table 9 is turned obliquely to the sides and ends of the box 1, as best seen in Fig. 3, thus forming a substantial support for the box and print, thereby holding the box erect while it is being filled. When the box has been properly filled, the supporting-table may be turned by one finger back in line with the box or mold 1, when by bearing down on said mold the same may be forced down around the print 7, table 9, and handle 2, leaving the print of butter 12 resting on the top of the print 7, free to be removed, as seen in Fig. 4. After the print of butter thus formed has been removed the mold may be reset, as shown in Figs. 3 and 1, and other prints molded in like manner in rapid succession.

The table 9 should at all times be free to be revolved on its pivot easily and quickly, the shoulder 4 acting as a support for the whole as well as a bearing for the said table to prevent binding between the table and its pivot.

What I claim, and desire to secure by Letters Patent, is—

1. In a device of the character described, a mold, a print, a handle, secured to said print, and a supporting-table pivotally secured to said handle below the print and adapted to freely turn thereon.

2. The combination with the mold, of a print, having a screw-threaded opening, a handle comprising an enlarged base, a reduced portion at its upper end partially screw-threaded and a shoulder below the reduced portion, and a supporting-table loosely pivoted on said reduced portion.

WILLIAM C. FREEMAN.

Witnesses:
   H. C. ROSE,
   L. W. BEEBE.